Dec. 27, 1966 S. L. JONASSEN 3,294,905

TELEVISION CABINET STRUCTURE WITH REMOVABLE FRAME SECTION

Filed Nov. 26, 1963 2 Sheets-Sheet 1

INVENTOR.
SEVERIN L. JONASSEN
BY
Harry W. Hargis III
AGENT

TELEVISION CABINET STRUCTURE WITH REMOVABLE FRAME SECTION

Filed Nov. 26, 1963 2 Sheets-Sheet 2

INVENTOR.
SEVERIN L. JONASSEN
BY
Harry W. Hargis III
AGENT 3,294,905
TELEVISION CABINET STRUCTURE WITH REMOVABLE FRAME SECTION Severin L. Jonassen, Lafayette Hill, Pa., assignor to Philco-Ford Corporation, a corporation of Delaware
Filed Nov. 26, 1963, Ser. No. 326,100
2 Claims. (Cl. 178—7.9)

This invention relates to cabinet structure, and more particularly to television cabinet structure. While of broader applicability, the invention has particular utility in the field of portable television receiver cabinets.

Portable television receiver cabinet structure has been primarily concerned with facilitating portability, and less concerned with blending with any particular decorative scheme. However, it is also very desirable that a portable receiver cabinet blend with its surroundings.

It is therefore a primary objective of this invention to provide simple and inexpensive means for selectively converting the appearance of a television receiver cabinet to conform to a particular decorative scheme.

The invention is featured by the provision of cabinet structure which makes it possible to provide optional finishes and styling at modest cost, whereby, in effect, additional models are made available by the utilization of alternative trim.

It is a more detailed objective of the invention to provide dismountable decorative panel means which may be disposed over the front of a television receiver cabinet without interfering with the viewing screen.

To the foregoing general ends, the invention comprises, in a preferred embodiment thereof, a decorative front frame panel substantially coextensive in size with the front surface of a television receiver cabinet, the panel cooperating with stepped portions provided on the cabinet front, along its top and sides, whereby to register the frame panel with the front surface of the cabinet, the frame panel being provided with an opening generally registering with the cathode ray tube viewing screen.

It is a feature of the invention that a selective group of panels be so constructed that their base or mounting portions are identical, but each panel may embody a distinctive decorative scheme. For example, the decorative panel may be of a molded plastic simulative of a hand carved wooden panel, and in which panel there may be simulated utilitarian elements such as drawers provided with decorative pulls or handles.

For a more complete understanding of the invention and the manner in which it achieves the foregoing as well as other objectives, reference is made to the following description taken in light of the accompanying drawing, in which.

Figures 1, 2:
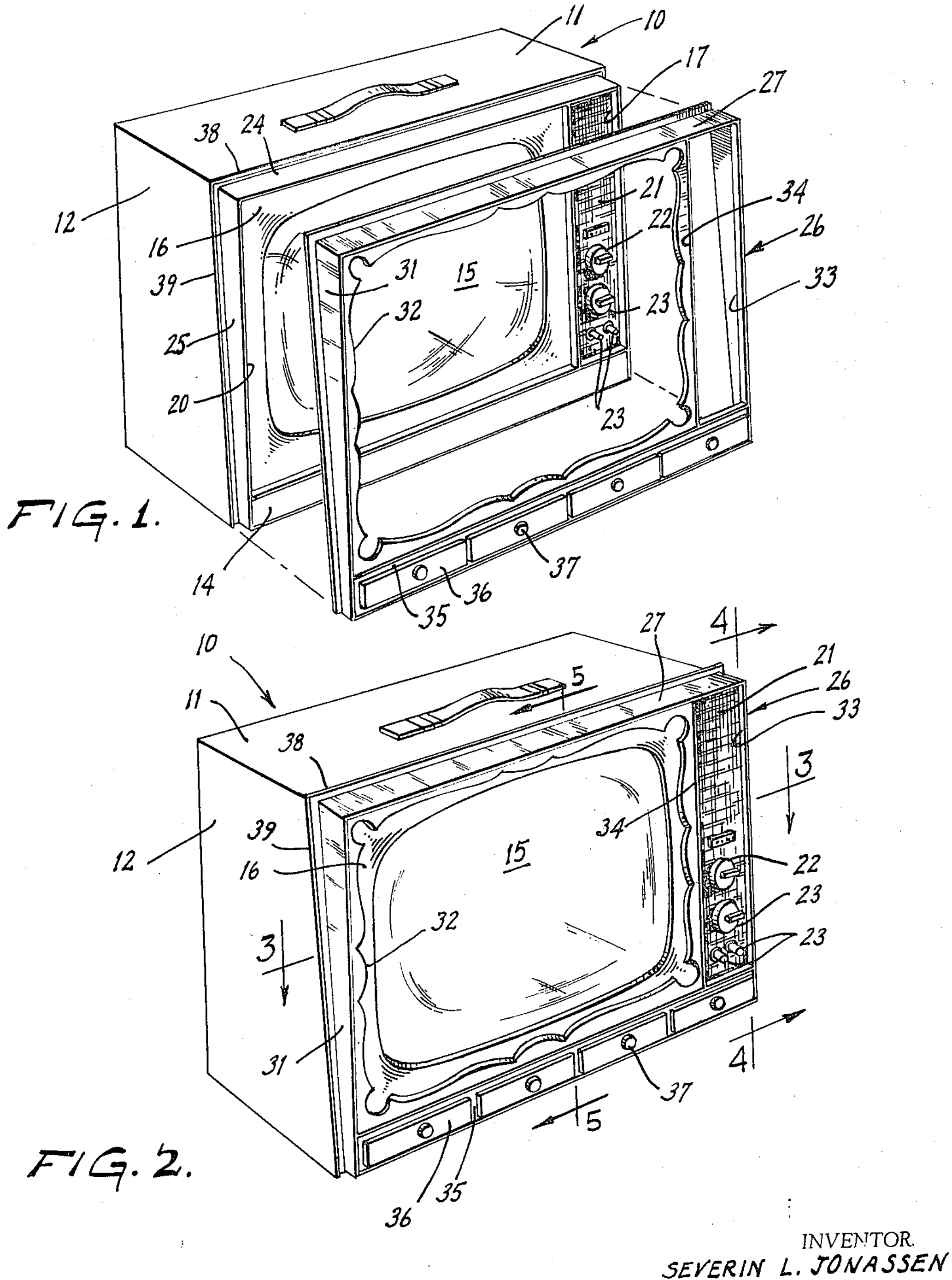
FIGURE 1 is an exploded view, in perspective of one example of television cabinet and decorative frame combination embodying the invention.
FIGURE 2 is a view similar to FIGURE 1 but showing the decorative frame applied to the cabinet.
Figures 3, 4, 5:
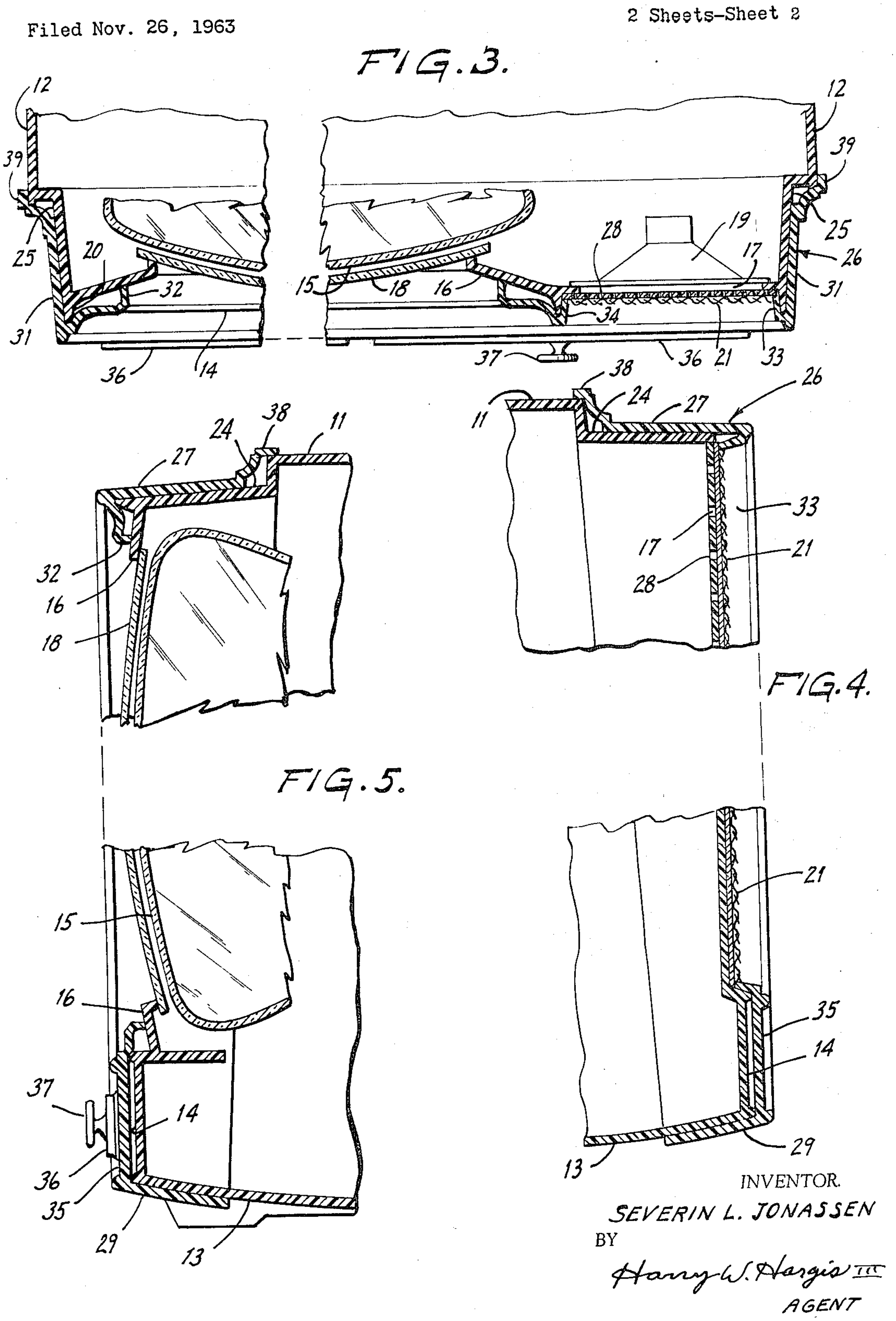
FIGURE 3 is an enlarged sectional view looking in the direction of arrows 3—3 as applied to FIGURE 2.
FIGURE 4 is an enlarged sectional view looking in the direction of arrows 4—4 as applied to FIGURE 2.
FIGURE 5 is an enlarged sectional view taken along the line indicated by arrows 5—5 as applied to FIGURE 2.

With more particular reference to the drawing, and first to FIGURES 1 and 2, a television receiver cabinet 10 of the portable type includes a top wall portion 11, side wall portions 12, a bottom wall portion 13, (see also FIGURES 4 and 5), and front wall portion 14 including a relatively large opening 20 for viewing screen 15 of a cathode ray tube about which extends a mask 16. A relatively small opening 17 in the front wall is covered by a decorative grill 21 and disposed for registery with a loudspeaker 19 (FIGURE 3). Additional elements of the receiver include a channel selector 22 and the various other manual control elements 23 normally associated with a television receiver. A conventional transparent screen 18 extends over the tube face or viewing screen 15 to protect the same (FIGURES 3 and 5).

Cabinet top and side wall portions 11 and 12 are inwardly stepped, as seen at 24 and 25, respectively, adjacent the peripheral edge portions of front wall portion 14.

In particular accordance with the present invention, a decorative front frame panel 26 is provided which is substantially coextensive in size with front wall portion 14 of cabinet 10 and includes stepped portions 27 and 31 that cooperate with stepped-down portions 24 and 25 and with the top and side wall portions 11 and 12 whereby to register the frame panel 26 with the front wall portion 14. Stepped portions 27 and 31 include flanges 38 and 39 that extend over top and side wall portions 11 and 12, preferably being disposed in frictional engagement therewith. Frame panel 26 includes a relatively large opening 32 generally registering with mask 16 and a relatively small opening 33 generally registering with loudspeaker opening 17. Control elements 22 and 23 extend through the frame panel opening 33. Frame panel openings 32 and 33 are separated by a cross member 34, and the portion of the frame panel making up the relatively large opening 32 is provided with a major portion of the decorative scheme, as is best seen in FIGURES 1 and 2. The remainder of the decorative scheme is provided by a lower horizontal portion 35 which may, for example, include simulated drawers, as seen at 36, provided with pulls indicated by numeral 37. These, or other trim details, may of course be varied to meet the desires of the individual user.

While grill cloth 21 has been illustrated as being separate from the frame panel 26, and mounted over loudspeaker opening 17 of the cabinet 10, instead it may be mounted over opening 33 in frame panel 26. In either arrangement, cloth 21 is provided with openings through which control elements 22 and 23 extend. Also cloth 21 preferably is backed by a perforate metal sheet 28 to which the cloth is cemented, the metal sheet in turn being cemented to cabinet elements extending over opening 17.

Attachment of the decorative frame panel is enhanced by the substantially frictional engagement of frame panel portions 31 and 27 with stepped down cabinet wall portions 25 and 24, respectively, that extend somewhat forwardly of the openings 17 and 20 in front wall portion 14. Also contributing to mounting of frame panel 26 is the frictional interengagement between a bottom flange portion 29 and bottom wall 13. This latter flange portion 29 is not, however, essential for all combinations of frame panel and cabinets, but may be included if desired.

It will be appreciated that the frame panel may be of molded plastic simulative of hand carved wood, and the same frame panel may have applied thereto various finishes. Also the panel includes portions such as the simulated drawers to which alternative trim details and hardware may be applied to vary the appearance of the panel and of the television cabinet to which the panel is applied.

While it is preferred that the frame panel be secured in place by frictional interengagement thereof with the cabinet, it may be desirable, under some conditions, to utilize auxiliary holding means. For example, threaded studs may be provided on hidden, rear surface portions of the frame panel to provide for screw attachment of the latter to portions of the cabinet adjacent the studs.

I claim:

1. In a television receiver comprising a cabinet housing a cathode ray tube and having at least top and side walls and a front opening, the viewing screen of said cathode ray tube lying in the general plane of said front opening, means framing said front opening and providing a mask for said viewing screen, comprising: individual and separable first and second frame sections each having a forwardly presented peripheral portion and top and side wall portions extending from said peripheral portion toward corresponding walls of said cabinet, said top and side wall portions of said first frame section being formed as a stepped extension of said cabinet and being nested within corresponding top and side wall portions of said second frame section, in such engagement with the latter as removably to maintain the second frame section mounted upon the first frame section, the said peripheral portion of said first frame section closely overlying the edges of said viewing screen and serving as a mask for the latter, and at least a part of said peripheral portion of said first frame section closely underlying the peripheral portion of said second frame section.

2. A television receiver according to claim 1, and characterized by the inclusion of a glass screen overlying said viewing screen and disposed adjacent said peripheral portion of said first frame section, said last recited peripheral portion being disposed intermediate said glass screen and peripheral portions of said second frame section.

References Cited by the Examiner

UNITED STATES PATENTS

| | | | |
|---|---|---|---|
| 2,596,710 | 5/1952 | Moricco et al. ---- | 178—7.9 X |
| 3,240,876 | 3/1966 | Whitney --------- | 178—7.82 X |

FOREIGN PATENTS

| | | |
|---|---|---|
| 1,121,956 | 8/1956 | France. |
| 1,192,676 | 10/1959 | France. |

DAVID G. REDINBAUGH, *Primary Examiner.*

R. L. RICHARDSON, *Assistant Examiner.*